United States Patent Office 2,992,282
Patented July 11, 1961

2,992,282
PREPARATION OF HIGH MOLECULAR WEIGHT ALKYL AROMATIC COMPOUNDS
Louis Schmerling, Riverside, Ill., assignor to Universal Oil Products Company, Des Plaines, Ill., a corporation of Delaware
No Drawing. Filed July 13, 1959, Ser. No. 826,396
15 Claims. (Cl. 260—671)

This invention relates to a method for the preparation of high molecular weight alkyl aromatic compounds and particularly to the preparation of alkyl aromatic hydrocarbons. More particularly the invention is concerned with a method for preparing pentadecyl aromatic hydrocarbons.

It has now been discovered that certain polymers possessing outstanding properties which make said polymers desirable as starting materials in the preparation of certain chemical compounds. For example, it has been found that detergents which are prepared from propylene pentamers (branched chain alkenes having 15 carbon atoms) possess increased detergency and wetting properties and other desirable properties over those which are prepared from propylene tetramers (branch chain alkenes having 12 carbon atoms). However, the preparation of propylene pentamer which is used in the preparation of pentadecyl aromatic hydrocarbons, which themselves are intermediates in the manufacture of detergents of the alkylarenesulfonate types, is difficult, inasmuch as the direct polymerization of propylene in the presence of the usual acid catalysts practically ceases at the tetramer stage of polymerization and yields only insignificant quantities of propylene pentamer.

Therefore, due to the fact that there is an increased demand for propylene pentamer, and a corresponding increasing demand for pentadecyl aromatic hydrocarbons, it is an object of this invention to provide a novel method for preparing the latter compounds.

A further object of this invention is to provide a method whereby pentadecyl aromatic hydrocarbons may be obtained in relatively larger yields and corresponding lower costs.

One embodiment of this invention resides in a process for the preparation of a high molecular weight alkyl aromatic compound which comprises hydrohalogenating an olefin polymer, condensing the resultant hydrohalogenated polymer with the olefin monomer and further condensing the resultant compound with an aromatic compound to form the desired high molecular weight alkyl aromatic compound.

A further embodiment of this invention is found in a process for the preparation of a high molecular weight alkyl aromatic hydrocarbon which comprises hydrohologenating an olefin polymer at a temperature in the range of from about 0° to about 50° C. and at a pressure in the range of from about 1 to about 50 atmospheres, condensing the resultant hydrohalogenated polymer with the olefin monomer in the presence of a Friedel-Crafts catalyst at a temperature in the range of from about −20° to about 150° C. and at a pressure in the range of from about atmospheric to about 100 atmospheres, and further condensing the resultant compound with an aromatic hydrocarbon in the presence of a Friedel-Crafts catalyst at a temperature in the range of from about 0° to about 100° C. and at a pressure in the range of from about atmospheric to about 100 atmospheres to form the desired high molecular weight alkyl aromatic hydrocarbon.

A specific embodiment of the invention resides in a process for the preparation of a high molecular weight alkyl aromatic hydrocarbon which comprises hydrohalogenating propylene tetramer with anhydrous hydrogen chloride at a temperature in the range of from about 0° to about 50° C. and at a pressure in the range of from about 1 to about 50 atmospheres, condensing the resultant dodecyl chlorides with propene in the presence of aluminum chloride at a temperature in the range of from about −20° to about +30° C. and at a pressure in the range of from about atmospheric to about 100 atmospheres and further condensing the resultant pentadecyl clorides with an aromatic hydrocarbon in the presence of aluminum chloride at a temperature in the range of from about 0° to about 25° C. and at a pressure in the range of from about atmospheric to about 100 atmospheres to form the desired pentadecyl aromatic compound.

A more specific embodiment of the invention is found in a process for the preparation of a pentadecylbenzene which comprises hydrochlorinating propylene tetramer with anhydrous hydrogen chloride at a temperature in the range of from about 20° to about 50° C. and at a pressure in range of from about 10 to about 30 atmospheres, condensing the resultant dodecyl chlorides with propene in the presence of ferric chloride at a temperature in the range of from about −20° to about +30° C. and at a pressure in the range of from about atmospheric to about 100 atmospheres and further condensing the resultant pentadecyl chlorides with benzene in the presence of ferric chloride at a temperature in the range of from about 50° to about 75° C. and at a pressure in the range of from about atmospheric to about 100 atmospheres to form the desired pentadecylbenzenes.

Other objects and embodiments referring to alternative polymers and to alternative catalysts will be found in the following further detailed description of the invention.

As hereinbefore set forth high molecular weight alkyl aromatic compounds and particularly pentadecyl aromatic compounds may be prepared by treatnig an olefin polymer with a hydrohalogenating agent, thereafter condensing the hydrohalogenated material with the olefin monomer, said monomer having the same number of carbon atoms as the monomer of the olefin polymer which was hydrohalogenated, and thereafter further condensing the resultant higher molecular weight alkyl halide with an aromatic compound, and particularly an aromatic hydrocarbon containing only carbon and hydrogen atoms, to form the desired high molecular weight alkyl aromatic compound. For example, propylene tetramer may be hydrochlorinated to form tertiary dodecyl chlorides which are then condensed with propene in the presence of Friedel-Crafts catalysts to yield pentadecyl chlorides, the latter material then being further condensed with an aromatic compound such as benzene in the presence of a Friedel-Crafts catalyst to form the desired high molecular weight alkyl aromatic compound such as pentadecylbenzene.

Polymeric hydrocarbons which may be used in the process of the present invention include propylene dimer, propylene trimer, propylene tetramer, etc., butylene dimer, butylene trimer, butylene tetramer, etc., said polymers having been prepared by any of the well known polymerization reactions, such as treating an olefinic hydrocarbon, or an organic compound capable of forming an olefinic hydrocarbon at polymerization conditions, in the presence of an acidic catalyst such as phosphoric acid in either liquid or solid form, or any other known polymerization catalyst. Unsaturated hydrocarbon monomers which may be condensed with the aforesaid polymers include those having at least three carbon atoms per molecule such as propene, 1-butene, 2-butene, 1-pentene, 2-pentene, 3-pentene, 1-hexene, 2-hexene, 3-hexene, 1-heptene, 2-heptene, 3-heptene, 4-heptene, etc. Cycloolefins may also be used, but not necessarily with equivalent results; these include cyclohexene, 1-methylcyclohexene, etc. It is also contemplated within the scope of this invention to use, as lower molecular weight polymers, the polymer obtained from certain compounds capable of producing olefinic hydrocarbons, or intermediates thereof, under polymerizing conditions. Typical olefin producing compounds capable of use include alkyl chlorides, alkyl bromides, and alkyl iodides capable of undergoing dehydrohalogenation to form olefinic hydrocarbons. Alcohols capable of dehydration to olefins under polymerizing conditions may also be used. Examples of such alkyl halides include n-propyl chloride, isopropyl chloride, n-butyl chloride, isobutyl chloride, t-butyl chloride, the pentyl chlorides, hexyl chlorides, etc., n-propyl bromide, isopropyl bromide, n-butyl bromide, isobutyl bromide, t-butyl bromide, the pentyl bromides, hexyl bromides, etc., ethyl iodide, n-propyl iodide, isopropyl iodide, n-butyl iodide, isobutyl iodide, t-butyl iodide, the amyl iodides, hexyl iodides, etc. Typical examples of alcohols are n-propyl alcohol, isopropyl alcohol, the butyl alcohols, the pentyl alcohols, the hexyl alcohols, etc.

The first step of the process, as hereinbefore set forth, comprises the hydrohalogenation of a polymeric hydrocarbon. This hydrohalogenation is effected by treating the polymeric hydrocarbon with the desired hydrohalogenating agent, the preferred agents comprising hydrogen chloride and hydrogen bromide in substantially anhydrous condition. The hydrohalogenation is effected at pressures ranging from about 1 to about 50 atmospheres, preferably in a range of from about 10 to about 30 atmospheres and at temperatures ranging from atmospheric to about 50° C. or more. It may be also carried out at subatmospheric temperatures ranging from 0° or below to 25° C. using a solvent such as acetic acid. It may also be accomplished at relatively low temperatures and pressures by using a catalyst, preferably a metal halide.

The second step of the process of the present invention, namely the condensation step, is effected by condensing the hydrohalogenated polymer with the desired olefinic monomer in the presence of a Friedel-Crafts metal halide catalyst such as aluminum chloride, zirconium chloride, ferric chloride, zinc chloride, bismuth chloride, boron trifluoride, etc. For purposes of this invention the compound boron trifluoride will be considered a metal halide although boron is, in reality, a metalloid. The condensation step is effected at a pressure ranging from about atmospheric to about 100 atmospheres or more and at a wide range of temperatures, said range being from about −50° to about 150° C. The wide range of temperatures is governed by the choice of Friedel-Crafts metal halide catalysts to be used in the condensation reaction. For example, when a relatively active Friedel-Crafts catalyst such as aluminum chloride or ferric chloride is used the temperature will range from about −20° to about +30° C., while if a relatively inactive Friedel-Crafts metal halide catalyst such as zinc chloride is used, the temperature which is required for successful condensation of the reactants will be in a range of from about 40° to about 100° C.

The final step or stage of the process, namely the condensation between the higher molecular weight alkyl halide containing only carbon, hydrogen and halogen atoms and the aromatic hydrocarbon containing only carbon and hydrogen atoms will also be effected at a pressure ranging from about atmospheric to about 100 atmospheres or more and at a wide range of temperatures, namely from about −50° to about +150° C., and preferably in a range of from about 0° to about 100° C. As in the second step of the process hereinbefore set forth the wide range of temperatures is possible inasmuch as the condensation step is also effected in the presence of a Friedel-Crafts metal halide catalyst of the type also hereinbefore set forth. As in the case of the second step of the process, in which the hydrohalogenated polymer is condensed with the olefin monomer containing the same number of carbon atoms as the monomer of the olefin polymer, when a relatively active catalyst is used, the temperature will range from about 0° (or even lower) to about 25° C., while the use of a relatively less active catalyst will require a higher temperature ranging from about 25° to about 100° C. to successfully effect the condensation between the hydrohalogenated compound and the aromatic hydrocarbon. When the aromatic hydrocarbon which is condensed with the hydrohalogenated compound possesses a relatively high melting point such as naphthalene, phenanthrene, chrysene, etc., the condensation is effected in the presence of a substantially inert organic solvent including paraffinic hydrocarbons such as n-pentane, n-hexane, n-heptane, cyclopentane, cyclohexane, cycloheptane, methylcyclopentane, etc. Aromatic hydrocarbons which may be condensed with the aforesaid hydrohalogenated compound include benzene, toluene, ethylbenzene, propylbenzene, isopropylbenzene (cumene), higher alkylbenzenes, o-xylene, m-xylene, p-xylene, o-diethylbenzene, m-diethylbenzene, p-diethylbenzene, higher dialkylbenzenes, various trialkylbenzenes, etc., naphthalene, 1-methylnaphthalene, 2-methylnaphthalene, 1-ethylnaphthalene, 2-ethylnaphthalene, 1,4-dimethylnaphthalene, 1,4-diethylnaphthalene, other alkyl naphthalenes, anthracene, 1-methylanthracene, 2-methylanthracene, 9-methylanthracene, other alkyl anthracenes, phenanthrene, chrysene, pyrene, triphenylene, and the alkyl substituted phenanthrenes, chrysenes, pyrenes, triphenylenes, etc.

The process of the present invention may be effected in any suitable manner and may comprise either a batch or a continuous type operation. When a batch type operation is used a quantity of the polymeric hydrocarbon is placed in a suitable apparatus such as a rotating autoclave. The autoclave is flushed with an inert gas such as nitrogen and is thereafter sealed. The hydrohalogenating agent such as the substantially anhydrous hydrogen chloride or hydrogen bromide is pressured into said apparatus until the desired pressure has been reached. Following a predetermined residence time the autoclave is vented to release any excess gases, the product is withdrawn, and the alkyl halide is recovered by distillation. The alkyl halide (at a temperature below the reaction temperature) is then placed in another suitable apparatus which may also comprise a rotating autoclave or an alkylation flask along with the Friedel-Crafts metal halide catalyst and inert diluent, such as a normal paraffin, if desired. The olefinic hydrocarbon, if in gaseous form, is pressed in until the desired pressure has been reached after which the autoclave is brought to the desired temperature, either subatmospheric if a relatively active Friedel-Crafts metal halide catalyst of the type hereinbefore set forth is used, or superatmospheric temperature if a relatively inactive catalyst of the type hereinbefore set forth is employed. Alternatively the apparatus containing the alkyl halide may be brought to the desired temperature according to the particular catalyst to be used, after which the catalyst is added, the mixture is continuously stirred and the olefinic hydrocarbon is then slowly added to said stirred mixture. After a predetermined residence time has been met, the apparatus and contents thereof are allowed to return to room temperature, the excess gases, if any, are vented, the higher molecular weight alkyl halide is separated from the catalyst layer and the desired product is recovered by conventional means such as fractional distillation, etc.

The aromatic compound and the particular Friedel-Crafts type catalyst which is used are then placed in a suitable apparatus, after which the apparatus is brought to the desired temperature, either subatmospheric or superatmospheric depending upon whether a relatively active Friedel-Crafts metal halide catalyst such as aluminum chloride or ferric chloride is used or a relatively inactive catalyst such as zinc chloride is used. The apparatus which may be used may comprise an autoclave if the condensation between the higher molecular weight alkyl halide and the aromatic hydrocarbon is to be effected at superatmospheric pressure. The higher molecular weight alkyl halide is then gradually added. After a predetermined residence time has been met, the apparatus and contents thereof are allowed to return to room temperature (if higher than atmospheric temperature), the excess gases, if any, are vented to the air or collected by suitable means such as a sodium-lime tower if the condensation has been effected at superatmospheric pressures, and the usually liquid, upper layer containing the desired product is separated from the catalyst layer. Following this the high molecular weight alkyl aromatic hydrocarbon is recovered from the washed upper layer by fractional distillation or other suitable means, e.g. fractional crystallization.

The process of this invention may also be effected in a continuous type operation. When this method is used, the polymeric hydrocarbon is continuously charged to a reaction zone which is maintained at the proper operating conditions of temperature and pressure. The reaction zone may comprise an unpacked vessel or coil or may be lined with an adsorbent packing material such as alumina, dehydrated bauxite, fire brick, and the like. The hydrohalogenating agent comprising a substantially anhydrous hydrohalide and preferably hydrogen chloride or hydrogen bromide is also continuously charged to the reaction zone through separate lines. The resultant alkyl halide is continuously withdrawn from the reactor and charged to a second reaction zone which may be similar in design to the first and which is also maintained at the proper operating conditions of temperature and pressure. This second reaction zone is provided with the suitable Friedel-Crafts metal halide catalyst. The alkyl halide is charged to this second reaction zone at a liquid hourly space velocity (volume of charge per volume of catalyst per hour) in a range of from about 0.1 to about 20 or more and preferably in a range of from about 0.5 to about 10. The olefinic hydrocarbon, in either gaseous or liquid form, is also continuously charged to this second reaction zone through separate lines. If so desired, the alkyl halide and olefinic hydrocarbon may be admixed prior to entry into said reaction zone and charged thereto in a single stream. One particularly suitable method of continuous type operation comprises the fixed bed type in which the catalyst is disposed as a fixed bed in the reaction zone and the reactants pass over said bed in either an upward or downward flow. Another suitable type of operation which may be used comprises the compact moving bed type of operation in which the catalyst and the reactants pass either concurrently or countercurrently to each other. Yet another type of operation which may be used comprises the slurry type of operation in which the catalyst is carried into the reaction zone as a slurry in either one or the other of the starting materials.

The condensation product comprising the higher molecular weight alkyl halide is continuously withdrawn from the second reaction zone, separated from unreacted starting materials, the latter being recycled to form a portion of the feed stock, and continuously charged to yet a third reaction zone which is also similar in design to the first and second reaction zone and which is also maintained at the proper operating conditions of temperature and pressure. This reaction zone also contains a Friedel-Crafts metal halide catalyst. The aromatic hydrocarbon which is to be condensed with the higher molecular weight alkyl halide is also continuously charged to this third reaction zone through a separate line or, if so desired, may be admixed with the higher molecular weight alkyl halide prior to entry into said reaction zone and the mixture charged thereto in a single stream. The higher molecular weight alkyl halide and the aromatic hydrocarbon are also charged to the reaction zone at a liquid hourly space velocity in the range of from about 0.1 to about 20 or more and preferably in a range of from about 0.5 to about 10. After a predetermined residence time has been completed the product is continuously withdrawn and passed to a fractionator or separation zone wherein the desired high molecular weight alkyl aromatic hydrocarbon is separated from undesired side reactions and/or unreacted starting materials and recovered. It is contemplated within the scope of this invention that the hydrohalide such as hydrogen chloride or hydrogen bromide which is formed in this latter step by reason of the condensation between the higher molecular weight alkyl halide and the aromatic hydrocarbon may be recycled to the first reaction zone to form the feed stock for the hydrohalogenation of the olefin polymer, this feature contributing to the economic feasibility of the process.

It is also contemplated within the scope of this invention that the higher molecular weight alkyl halide which is prepared according to the second step of this process may be dehydrohalogenated by any suitable means and the resulting alkene then condensed with the desired aromatic hydrocarbon. Thus, for example, propylene tetramer may be hydrochlorinated with anhydrous hydrogen chloride to form tertiary dodecyl chlorides, the latter then being condensed with propene in the presence of a Friedel-Crafts catalyst to form pentadecyl chloride. This higher molecular weight alkyl halide may then be dehydrochlorinated by passing said compound over calcium chloride following which the pentadecene (propylene pentamer) is then condensed with an aromatic hydrocarbon such as benzene, using as catalyst either a Friedel-Crafts halide catalyst or, preferably an acid catalyst such as sulfuric acid, phosphoric acid, hydrogen fluoride, silica-alumina, etc.

The following examples, which are given to illustrate the process of the present invention are not, however, intended to limit the generally broad scope of the present invention in strict accordance therewith.

Example I

In this experiment 546 g. of propylene tetramer were placed in the glass liner of a rotating autoclave having a 3600 cc. capacity. The liner was flushed with nitrogen and then charged to 30 atmospheres with anhydrous hydrogen chloride. The temperature during the reaction period ranged from 24° to 30° C. and was maintained thereat for a period of about 6.5 hours. The pressure fell to about 15 atmospheres during twenty minutes, and when this point was reached the autoclave was recharged with additional anhydrous hydrogen chloride until a pressure of 30 atmospheres was again reached, said autoclave being thus recharged seven times during the residence time. At the end of this reaction period the excess gases were vented and 667 g. of liquid product was recovered. The product was subjected to fractional distillation and the cut boiling at 63° C. at 1.2 mm. pressure (231° C. at 760 mm. pressure) having a refractive index, $n_D^{20}$ 1.4485, comprising propylene tetramer hydrochloride (chiefly tertiary dodecyl chlorides) was recovered.

A three-necked alkylation flask was used for the condensation of the tertiary dodecyl chlorides, a mixture of 48 g. (0.38 mole) of this propylene tetramer hydrochloride along with 38 g. of n-pentane being placed in said flask. The stirred mixture was cooled to −50° C. in a Dry Ice-acetone bath. Five grams of the catalyst consisting of ferric chloride was then added and propene was bubbled beneath the surface of the stirred mixture. The temperature of the reaction mixture was permitted to rise slowly to about −9° C. at which point rapid absorption of the propene took place. The temperature of the reaction mixture was maintained in the range of from about −20° to about 0° C. during the addition of 25 g. of propene in one hour. Stirring was continued for an additional two hours after which time the reaction mixture was allowed to warm to room temperature. The liquid product consisting of about 133 g. was decanted from the coagulated catalyst, washed with water, dried and subjected to fractional distillation from potassium carbonate. The cut boiling at 102–106° C. at 1.5 mm. pressure (283–290° C. at 760 mm. pressure) was recovered. This cut had a refractive index, $n_D^{20}$ 1.4561.

The pentadecyl chloride (10 g.), the preparation of which was described in the above paragraphs, was placed in a 100 cc. round bottom flask along with 30 g. of benzene. A Friedel-Crafts catalyst comprising 1 g. of ferric chloride was added to the resulting solution and the flask was attached to a reflux column, the overhead of which was connected to a soda-lime tower. The flask was heated to a temperature in the range of 55° to 65° C. for about two hours after which the flask was allowed to cool to room temperature, and the dark liquid product was decanted from the granular catalyst, taken up with ether, washed with water, dried and fractionally distilled under reduced pressure in a Minical column. The cut boiling at 109–111° C. at 1.7 mm. pressure (290–294° C. at 760 mm. pressure), comprising pentadecylbenzene, was recovered. This cut had a refractive index $n_D^{20}$ 1.4863 and an analysis of the cut showed the following results: Found: C, 87.50; H, 12.41. Calculated for: $C_{15}H_{31}C_6H_5$; C, 87.42; H, 1258.

Example II

This example illustrates the use of aluminum chloride as catalyst in the second and third condensation steps. Propylene tetramer hydrochloride is prepared in a manner similar to that set forth in Example I above, that is, propylene tetramer is placed in the glass liner of a rotating autoclave, the liner is flushed with nitrogen and then charged to 30 atmospheres with anhydrous hydrogen chloride. During the reaction time the pressure falls to about 15 atmospheres and when this point is reached the autoclave is recharged with additional anhydrous hydrogen chloride until a pressure of 30 atmospheres is again reached. At the end of the reaction time the excess gases are vented and the liquid product is recovered. The liquid product is subjected to fractional distillation and the cut consisting chiefly of tertiary dodecyl chlorides is recovered.

The tertiary dodecyl chlorides are condensed with propene by placing said tertiary dodecyl chlorides in an alkylation flask along with a solvent comprising n-pentane, the resulting solution being stirred and cooled to −50° by means of a Dry Ice-acetone bath. Five grams of the catalyst consisting of aluminum chloride is added and the propene is bubbled beneath the surface of the stirred mixture. The temperature of the mixture is allowed to rise to approximately −10° C. and then is maintained in the range of from about −20° to about 0° C. for an additional period of one hour. The mixture is stirred for an additional two hours after which time the reaction mixture is allowed to warm to room temperature. The liquid product is decanted from the catalyst, washed with water, dried and subjected to fractional distillation from potassium carbonate. The cut comprising pentadecyl chloride is separated and recovered.

A solution of 12 g. of the pentadecyl chloride thus prepared in 100 g. of toluene is slowly added to an alkylation flask containing 100 g. of toluene to which is added 5 g. of aluminum chloride. The temperature during the addition is maintained in the range of from about 0° to about 25° C. for a period of about 5 hours. At the end of this time the liquid product is decanted from the catalyst, washed with water, dried and fractionally distilled under reduced pressure, the desired cut consisting of pentadecyltoluene being recovered therefrom.

Example III

In this example naphthalene is alkylated by the pentadecyl chloride prepared in a manner similar to that set forth in the above examples, that is, by treating propylene tetramer with anhydrous hydrogen chloride and condensing the resultant tertiary dodecyl chlorides with propene in the presence of a Friedel-Crafts catalyst and recovering the resultant pentadecyl chloride. The pentadecyl chloride is then condensed with naphthalene dissolved in n-pentane in a manner similar to that set forth above by condensing said pentadecyl chlorides with naphthalene in the presence of an aluminum chloride catalyst at a temperature ranging from about 40° to about 100° C. for a period ranging from about 2 to about 10 hours (depending on the temperature) in an alkylation flask and in the presence of a solvent comprising n-pentane. The liquid product is separated from the catalyst, washed with water, dried and subjected to fractional distillation under reduced pressure, the cut consisting of pentadecylnaphthalenes being separated and recovered therefrom.

I claim as my invention:

1. A process for the preparation of a high molecular weight alkyl aromatic compound which comprises hydrohalogenating a polymer of an olefin monomer of at least 3 carbon atoms per molecule, condensing the resultant hydrohalogenated polymer with an additional quantity of said olefin monomer, and further condensing the resultant compound with an aromatic compound to form the desired high molecular weight alkyl aromatic compound.

2. A process for the preparation of a high molecular weight alkyl aromatic hydrocarbon which comprises hydrohalogenating a polymer of an olefin monomer of at least 3 carbon atoms per molecule, condensing the resultant hydrohalogenated polymer with an additional quantity of said olefin monomer, and further condensing the resultant compound with an aromatic hydrocarbon to form the desired high molecular weight alkyl aromatic hydrocarbon.

3. A process for the preparation of a high molecular weight alkyl aromatic hydrocarbon which comprises hydrohalogenating a polymer of an olefin monomer of at least 3 carbon atoms per molecule, condensing the resultant hydrohalogenated polymer with an additional quantity of said olefin monomer in the presence of a Friedel-Crafts catalyst, and further condensing the resultant compound with an aromatic hydrocarbon in the presence of a Friedel-Crafts catalyst to form the desired high molecular weight alkyl aromatic hydrocarbon.

4. A process for the preparation of a high molecular weight alkyl aromatic hydrocarbon which comprises hydrohalogenating a polymer of an olefin monomer of at least 3 carbon atoms per molecule, at a temperature in the range of from about 0° to about 50° C. and at a pressure in the range of from about 1 to about 50 atmospheres, condensing the resultant hydrohalogenated polymer with an additional quantity of said olefin monomer in the presence of a Friedel-Crafts catalyst at a temperature in the range of from about −20° to about 150° C. and at a pressure in the range of from about atmospheric to about 100 atmospheres, and further condensing the resultant compound with an aromatic hydrocarbon in the presence of a Fridel-Crafts catalyst at a temperature in the range of from about 0° to about 100° C. and at a pressure in the range of from about atmospheric to about 100 atmospheres to form the desired high molecular weight alkyl aromatic hydrocarbon.

5. A process for the preparation of a high molecular weight alkyl aromatic hydrocarbon which comprises hydrochlorinating a polymer of an olefin monomer of at least 3 carbon atoms per molecule with anhydrous hydrogen chloride at a temperature in the range of from about 0° to about 50° C. and at a pressure in the range of from about 1 to about 50 atmospheres, condensing the resultant hydrochlorinated polymer with an additional quantity of said olefin monomer in the presence of a Friedel-Crafts catalyst at a temperature in the range of from about −20° to about 150° C. and at a pressure in the range of from about atmospheric to about 100 atmospheres, and further condensing the resultant compound with an aromatic hydrocarbon in the presence of a Friedel-Crafts catalyst at a temperature in the range of from about 0° to about 100° C. and at a pressure in the range of from about atmospheric to about 100 atmospheres to form the desired high molecular weight alkyl aromatic hydrocarbon.

6. A process for the preparation of a high molecular weight alkyl aromatic hydrocarbon which comprises hydrobrominating a polymer of an olefin monomer of at least 3 carbon atoms per molecule with anhydrous hydrogen bromide at a temperature in the range of from about 0° to about 50° C. and at a pressure in the range of from about 1 to about 50 atmospheres, condensing the resultant hydrobrominated polymer with an additional quantity of said olefin monomer in the presence of a Friedel-Crafts catalyst at a temperature in the range of from about −20° to about 150° C. and at a pressure in the range of from about atmospheric to about 100 atmospheres, and further condensing the resultant compound with an aromatic hydrocarbon in the presence of a Friedel-Crafts catalyst at a temperature in the range of from about 0° to about 100° C. and at a pressure in the range of from about atmospheric to about 100 atmospheres to form the desired high molecular weight alkyl aromatic hydrocarbon.

7. A process for the preparation of a high molecular weight alkyl aromatic hydrocarbon which comprises hydrochlorinating a polymer of an olefin monomer of at least 3 carbon atoms per molecule with anhydrous hydrogen chloride at a temperature in the range of from about 0° to about 50° C. and at a pressure in the range of from about 1 to about 50 atmospheres, condensing the resultant hydrochlorinated polymer with an additional quantity of said olefin monomer in the presence of aluminum chloride at a temperature in the range of from about −20° to about +30° C. and at a pressure in the range of from about atmospheric to about 100 atmospheres, and further condensing the resultant compound with an aromatic hydrocarbon in the presence of aluminum chloride at a temperature in the range of from about 0° to about +25° C. and at a pressure in the range of from about atmospheric to about 100 atmospheres to form the desired high molecular weight alkyl aromatic hydrocarbon.

8. A process for the preparation of a high molecular weight alkyl aromatic hydrocarbon which comprises hydrochlorinating a polymer of an olefin monomer of at least 3 carbon atoms per molecule with anhydrous hydrogen chloride at a temperature in the range of from about 0° to about 50° C. and at a pressure in the range of from about 1 to about 50 atmospheres, condensing the resultant hydrochlorinated polymer with an additional quantity of said olefin monomer in the presence of ferric chloride at a temperature in the range of from about −20° to about +30° C. and at a pressure in the range of from about atmospheric to about 100 atmospheres, and further condensing the resultant compound with an aromatic hydrocarbon in the presence of ferric chloride at a temperature in the range of from about 0° to about +25° C. and at a pressure in the range of from about atmospheric to about 100 atmospheres to form the desired high molecular weight alkyl aromatic hydrocarbon.

9. A process for the preparation of a high molecular weight alkyl aromatic hydrocarbon which comprises hydrochlorinating a polymer of an olefin monomer of at least 3 carbon atoms per molecule with anhydrous hydrogen chloride at a temperature in the range of from about 0° to about 50° C. and at a pressure in the range of from about 1 to about 50 atmospheres, condensing the resultant hydrochlorinated polymer with an additional quantity of said olefin monomer in the presence of zinc chloride at a temperature in the range of from about 40° to about 100° C. and at a pressure in the range of from about atmospheric to about 100 atmospheres, and further condensing the resultant compound with an aromatic hydrocarbon in the presence of zinc chloride at a temperature in the range of from about 40° to about 100° C. and at a pressure in the range of from about atmospheric to about 100 atmospheres to form the desired high molecular weight alkyl aromatic hydrocarbon.

10. A process for the preparation of a high molecular weight aromatic hydrocarbon which comprises hydrochlorinating propylene tetramer with anhydrous hydrogen chloride at a temperature in the range of from about 0° to about 50° C. and at a pressure in the range of from about 1 to about 50 atmospheres, condensing the resultant dodecyl chlorides with propene in the presence of aluminum chloride at a temperature in the range of from about −20° to about +30° C. and at a pressure in the range of from about atmospheric to about 100 atmospheres, and further condensing the resultant pentadecyl chloride with an aromatic hydrocarbon in the presence of aluminum chloride at a temperature in the range of from about 0° to about 25° C. and at a pressure in the range of from about atmospheric to about 100 atmospheres, to form the desired high molecular alkyl aromatic hydrocarbon.

11. A process for the preparation of a high molecular weight alkyl aromatic hydrocarbon which comprises hydrobrominating propylene tetramer with anhydrous hydrogen bromide at a temperature in the range of from about 0° to about 50° C. and at a pressure in the range of from about 1 to about 50 atmospheres, condensing the resultant dodecyl bromides with propene in the presence of aluminum chloride at a temperature in the range of from about −20° to about +30° C. and at a pressure in the range of from about atmospheric to about 100 atmospheres, and further condensing the resultant pentadecyl bromide with an aromatic hydrocarbon in the presence of aluminum chloride at a temperature in the range of from about 0° to about 25° C. and at a pressure in the range of from about atmospheric to about 100 atmospheres, to form the desired high molecular alkyl aromatic hydrocarbon.

12. A process for the preparation of a high molecular weight alkyl aromatic hydrocarbon which comprises hydrochlorinating propylene tetramer with anhydrous hydrogen chloride at a temperature in the range of from about 0° to about 50° C. and at a pressure in the range of from about 1 to about 50 atmospheres, condensing the resultant dodecyl chlorides with propene in the presence of zinc chloride at a temperature in the range of from about 40° to about 100° C. and at a pressure in the range of from about atmospheric to about 100 atmospheres, and further condensing the resultant pentadecyl chloride with an aromatic hydrocarbon in the presence of zinc chloride at a temperature in the range of from about 40° to about 100° C. and at a pressure in the range of from about atmospheric to about 100 atmospheres, to form the desired high molecular alkyl aromatic hydrocarbon.

13. A process for the preparation of a pentadecylbenzene which comprises hydrochlorinating propylene tetramer with anhydrous hydrogen chloride at a temperature in the range of from about 20° to about 50° C. and at a pressure in the range of from about 10 to about 30 atmospheres, condensing the resultant dodecyl chlorides with propene in the presence of ferric chloride at a temperature in the range of from about −20° to about +30° C. and at a pressure in the range of from about atmospheric to about 100 atmospheres, and further condensing the resultant pentadecyl chloride with benzene in the presence of ferric chloride at a temperature in the range of from about 50° to about 75° C. and at a pressure in the range of from about atmospheric to about 100 atmospheres to form the desired pentadecylbenzene.

14. A process for the preparation of a pentadecyltoluene which comprises hydrochlorinating propylene tetramer with anhydrous hydrogen chloride at a temperature in the range of from about 20° to about 50° C. and at a pressure in the range of from about 10 to about 30 atmospheres, condensing the resultant dodecyl chlorides with propene in the presence of aluminum chloride at a temperature in the range of from about −20° to about +30° C. and at a pressure in the range of from about atmospheric to about 100 atmospheres, and further condensing the resultant pentadecyl chloride with toluene in the presence of aluminum chloride at a temperature in the range of from about 0° to about 25° C. and at a pressure in the range of from about atmospheric to about 100 atmospheres to form the desired pentadecyltoluenes.

15. A process for the preparation of a pentadecylnaphthalene which comprises hydrochlorinating propylene tetramer with anhydrous hydrogen chloride at a pressure in the range of from about 10 to about 30 atmospheres and at a temperature in the range of from about 20° to about 50° C., condensing the resultant dodecyl chlorides with propene in the presence of aluminum chloride at a temperature in the range of from about −20° to about +30° C. and at a pressure in the range of from about atmospheric to about 100 atmospheres, and further condensing the resultant pentadecyl chloride with naphthalene in the presence of aluminum chloride at a temperature in the range of from about 40° to about 100° C. and at a pressure in the range of from about atmospheric to about 100 atmospheres to form the desired pentadecylnaphthalenes.

References Cited in the file of this patent

UNITED STATES PATENTS

| | | |
|---|---|---|
| 2,533,053 | Schmerling | Dec. 5, 1950 |
| 2,666,084 | Detling et al. | Jan. 12, 1954 |
| 2,810,769 | Danford et al. | Oct. 22, 1957 |